O. H. & W. G. PEEPLES.
GARDEN IMPLEMENT.
APPLICATION FILED NOV. 9, 1909.
959,797.
Patented May 31, 1910.
2 SHEETS—SHEET 1.
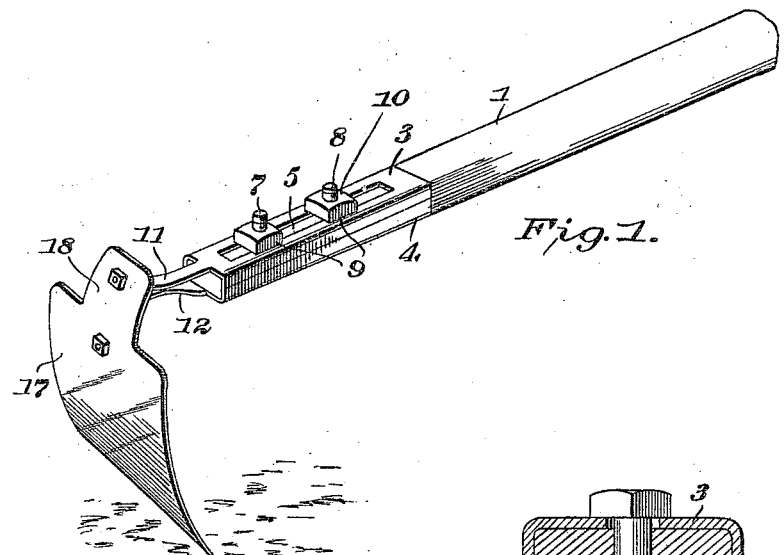
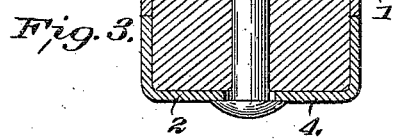
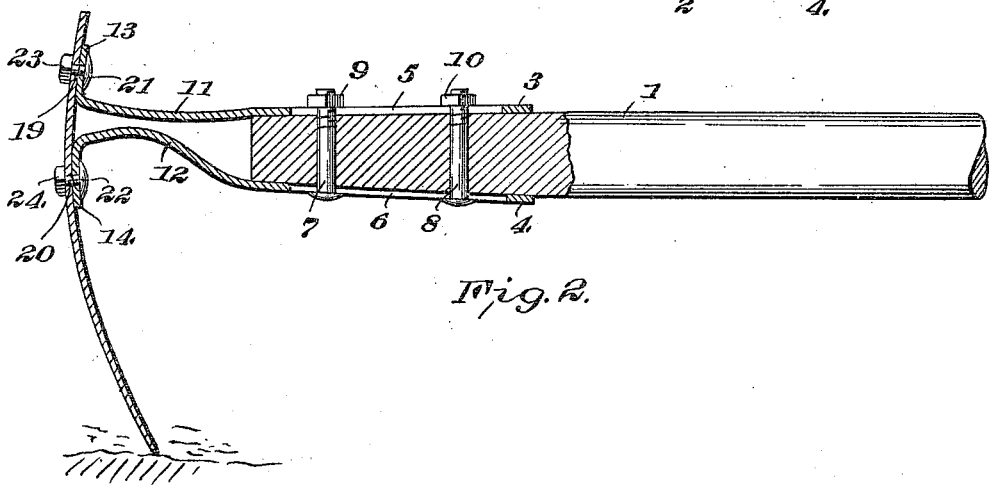
Witnesses
E. R. Peek
S. L. Burket
Inventors
Oscar H. Peeples
Wm G. Peeples
By
Simon Lyon
Attorney

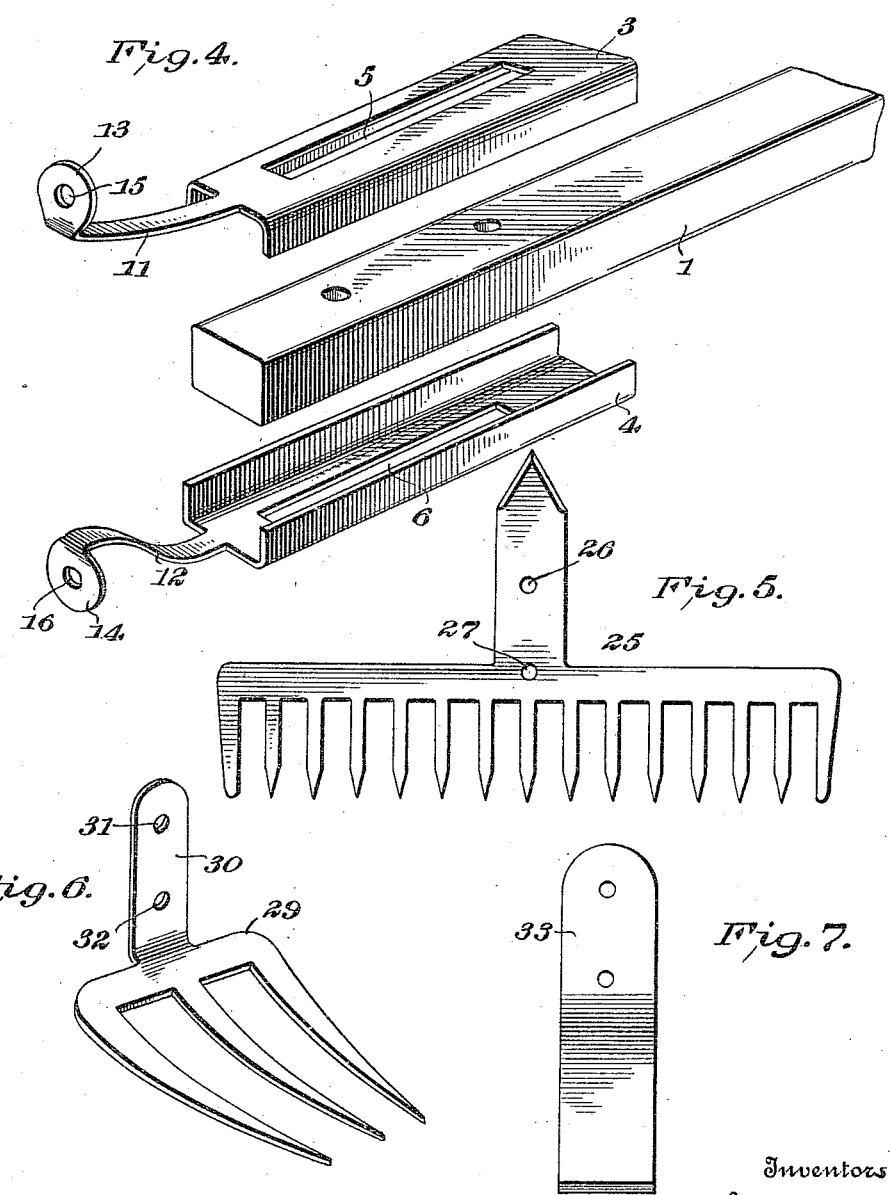

UNITED STATES PATENT OFFICE.

OSCAR HAMTON PEEPLES AND WILLIAM GASTON PEEPLES, OF GRENADA, MISSISSIPPI.

GARDEN IMPLEMENT.

959,797. Specification of Letters Patent. Patented May 31, 1910.

Application filed November 9, 1909. Serial No. 526,989.

*To all whom it may concern:*

Be it known that we, OSCAR H. PEEPLES and WILLIAM G. PEEPLES, citizens of the United States, residing at Grenada, Grenada county, Mississippi, have invented certain new and useful Improvements in Garden Implements; and we do hereby declare the following to be a full, clear, and exact description of the invention, such as will enable others skilled in the art to which it appertains to make and use the same.

Our invention relates to improvements in a combination garden implement.

The object of our invention is to provide a handle so constructed and arranged that a hoe, fork, rake or other implement may be readily attached and adjusted to be set at any desired angle, said adjustment being such that it does not require the removal of the implement from the handle.

Another object of our invention is to provide a more simple, cheap and effective implement whereby a rake, hoe and fork is combined into one and in which the different implements are readily attached to the handles.

In the accompanying drawings, Figure 1, is a perspective view of our improved implement showing a hoe applied thereto. Fig. 2, is a longitudinal sectional view of Fig. 1. Fig. 3, is a transverse sectional view of Fig. 1. Fig. 4, is a perspective of the attaching means removed from the handle. Fig. 5, is a plan view of a rake adapted to be secured to the handle. Fig. 6, is a perspective view of a fork adapted to be secured to the handle. Fig. 7, is a plan view of a weeder applied in the same manner as the hoe in Fig. 1.

Referring now to the drawings, 1 represents our handle which is of wood and of a round elongated form similar to handles used on implements of the character heretofore stated. The lower end of the handle is preferably of a square form as indicated at 2, in Fig. 3, for the purpose of more firmly holding the implement attaching members 3 and 4, which we will now describe. These members 3 and 4, are metal plates of an elongated form U-shaped in cross section to correspond with the lower end of the handle and adapted to receive said handle. As shown, the plate 3, is on the upper face of the handle and the plate 4, on the lower face and practically covers the lower end of the handle. The plates 3 and 4, are provided in their outer faces with elongated longitudinally extending slots 5 and 6, through which the bolts 7 and 8 pass. These bolts as will be seen extend through the lower squared end of the handle and are rigid within the handle, but they passing through the slots 5 and 6, allow the independent longitudinal adjustment of the plates 3 and 4. The bolts 7 and 8 are provided with the nuts 9 and 10 which engage the plate 3 and the heads of the bolts engage the plate 4 on the opposite side of the handle. By tightening the nuts it will be seen that the plates are rigidly held in their adjusted position.

The outer ends of the plates 3 and 4 are provided with the reduced extensions 11 and 12 which have their outer ends turned laterally as indicated at 13, and 14. These laterally turned ends of the extensions are provided with openings 15 and 16. The hoe 17, shown in Fig. 1, is of the ordinary form having a slight extension 18, which is provided with the two openings 19 and 20 which are spaced a distance apart equal to the distance between the openings 15 and 16, and registering therewith. Passing through said openings in the laterally turned ends 13 and 14, and the openings in the hoe, are bolts 21 and 22, having nuts 23 and 24, to firmly clamp the hoe to the laterally turned ends. By this structure it will be seen that the hoe may be readily removed when desired.

By loosening the nuts 9 and 10, the plates 3 and 4, may be independently adjusted in or out the slots therein allowing for said adjustment, whereby the hoe can be adjusted at different angles as clearly shown in dotted lines Fig. 2, of the drawings.

The rake 25 is secured to the handle in the same manner as the hoe. All that is necessary is to remove the nuts 23 and 24, said rake being provided with the properly spaced openings 26 and 27. The weeder 28 is likewise attached to the handle. The fork 29 is provided with a laterally turned flange 30 having the openings 31 and 32 properly spaced to receive the securing bolts, the laterally turned flange bringing the prongs of the fork parallel with the handle 1.

What we claim is:—

1. An implement of the character described, comprising a handle, plates longitudinally adjustably carried by the handle, and an implement independently and removably secured to the outer ends of said plates.

2. An implement of the character described, comprising a handle, plates on opposite sides of said handle and having longitudinal slots therein, bolts carried by the handle and passing through said slots and holding the plates in their adjusted position on the handle, and an implement independently and removably secured to said plates.

3. An implement of the character described, comprising a handle, plates on opposite sides of the handle and having longitudinal slots therein, bolts carried by the handle and passing through the slots and adapted to lock the plates in their adjusted position, the outer ends of the plates turned laterally in opposite directions, an implement resting against said laterally turned ends of the plate and bolts passing through the laterally turned ends and implement and removably securing the same thereto.

4. An implement of the character described, comprising a handle, plates adjustably carried thereby and having laterally turned ends provided with openings, and implements of different character having openings adapted to register with the opening in the laterally turned ends and bolts passing through the openings whereby the different implements may be readily attached.

5. An implement of the character described, comprising a handle, plates on opposite sides of the handle to inclose the same, and having longitudinal slots therein, bolts carried by the handle and passing through slots and adapted to lock the plates in their adjusted position, the plates having reduced extensions having laterally turned ends in opposite directions, said laterally turned ends having openings therein, an implement resting against said laterally turned ends and having openings registering therewith, and bolts passing through the laterally turned ends and implement, and removably securing the same thereto, substantially as shown and described.

In testimony whereof we affix our signatures, in presence of two witnesses.

OSCAR HAMTON PEEPLES.
WILLIAM GASTON PEEPLES.

Witnesses:
JNO. S. KING,
M. McKIBBEN.